May 24, 1938. E. A. SCHAEFFER, JR 2,118,361
QUICK ACTION NUT
Filed Dec. 9, 1936
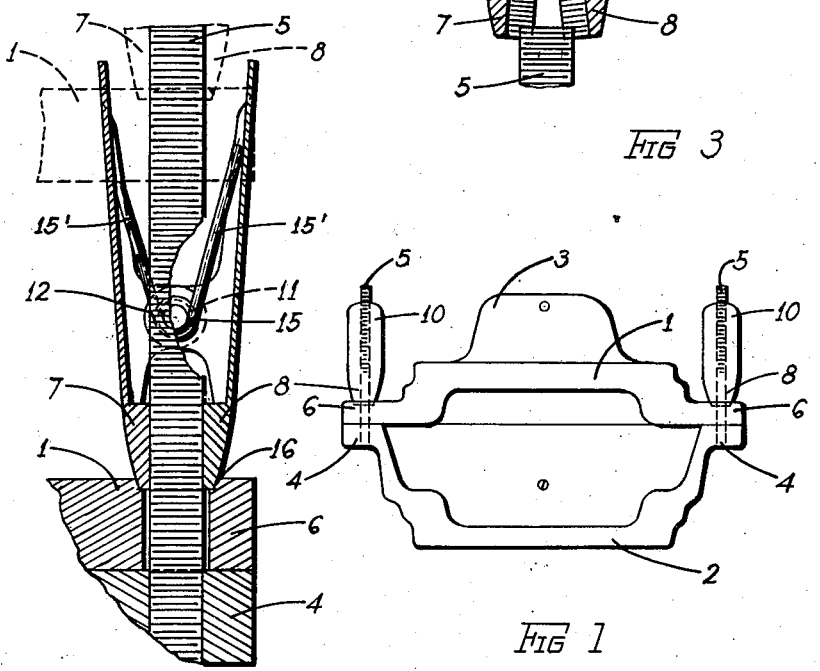

Patented May 24, 1938

2,118,361

UNITED STATES PATENT OFFICE 2,118,361

QUICK ACTION NUT

Ethan A. Schaeffer, Jr., Springfield, Ohio

Application December 9, 1936, Serial No. 114,983

4 Claims. (Cl. 85—33)

This invention relates to nuts, it particularly relating to a nut of a quick action type; that is, a nut which may be applied or detached from a threaded member, such as a threaded rod, without the necessity of screwing the nut on or off the major portion of the rod.

The object of the invention is to provide a quick acting nut which will be simple in construction, economical in manufacture and effective in operation.

A further object of the invention is to provide means for positively locking the members of a divided nut together.

In the present case I have shown the application of the nut for the purpose of clamping together the two clamping members of a paint agitating machine, although it will be understood that the nut may have other various uses than this.

In the accompanying drawing:

Fig. 1 is a front elevation showing more or less conventionally two clamping members of a paint agitating machine with the improved nut applied thereto.

Fig. 2 is a top plan view of a nut embodying my improvements showing a portion of one of the clamping members to which it is applied.

Fig. 3 is a side elevation partly in section of the nut with the jaws or nut proper in open position and also showing a portion of a threaded rod to which the nut is applied.

Fig. 4 is a section on the line 4—4 of Fig. 2.

Referring to the drawing, there is shown conventionally two clamping members 1 and 2, these clamping members as before stated being parts of a paint agitating machine such as the one described in the application of Charles L. Friermood, Serial No. 65,625, filed February 25, 1936. The member 2 is a non-adjustable member and has a bracket 3 by which it is attached to the agitating apparatus. The member 2 has a pair of ears 4 to which are connected threaded rods 5 which rods project loosely through ears 6 on the adjustable member 1. Heretofore it has been common to employ wing nuts on these rods to clamp the two clamping members together, it being necessary to screw these wing nuts a considerable distance on the threaded rods to clamping position or off of the rods when it is desired to remove the adjustable clamping member from the stationary clamping member. In order to avoid this necessity I have devised a nut which can be readily slipped over the threaded rods to approximately clamping position so that but a few turns of the nut will cause it to engage the adjustable clamping member and clamp it to the stationary member 2. Also, when it is desired to remove the adjustable member, a few turns of the nut will serve to allow it to be readily removed from the rod.

The nut proper is formed of two threaded members 7 and 8, each of which has connected therewith, preferably integrally but not necessarily so, a lever, one being indicated at 9 and the other at 10. These levers in the present case are comparatively wide and have integrally projecting overlapping ears 11 and 12 which are pivoted together by rivets 13 and 14. The rivet 14 is extended so as to provide a bearing for a coil spring 15, the ends of which are extended as indicated at 15' and bear respectively against the inner faces of the levers so as to normally hold the two parts of the divided nut 7 and 8 in engagement with the threads of the rod.

In operation when it is desired to insert the nut on the rod the upper ends of the levers are grasped by the operator and squeezed together against the tension of the spring so as to separate the two members of the nut as shown in Fig. 3. The nut can then be readily slid over the threaded rod to approximately clamping position. A few turns of the nut then causes the nut to impinge the adjustable clamping member 1. In order to lock the nut in clamping position the ear 6 of the clamping member 1 is provided with a recess 16 and each of the members 7 and 8 of the nut are beveled so as to readily enter the recess. This locks the nut in clamping position. When it is desired to remove the nut it is given a few turns so as to remove the beveled surfaces of the nut from the recess after which the levers may be again manipulated so as to separate the two members of the nut after which the nut may be slid over the rod and removed therefrom.

Having thus described my invention, I claim:

1. In a quick acting nut, a pair of internally threaded rotatable members, a lever connected with each of said members, a pivot for pivotally connecting said levers together, a coil spring arranged about said pivot, the ends of said coil spring being extended and bearing respectively against the interior faces of said levers.

2. In a clamping apparatus, a non-adjustable clamping member, an adjustable clamping member, a plurality of threaded rods connected with said non-adjustable member and extending loosely through apertures in said adjustable member, and a quick acting nut for each of said threaded rods consisting of a pair of internally threaded rotatable members, manually operated means for separating said members and temporarily holding them separated to permit the nut to be quickly inserted or removed from its corresponding rod, and spring means operating upon said first mentioned means to hold said threaded members in engagement with said rod, said adjustable clamping member having a recess to receive said internally threaded members after they have been threaded on said rod to clamping position.

3. In a clamping apparatus, a non-adjustable clamping member, an adjustable clamping member, a plurality of threaded rods connected with said non-adjustable member and extending loosely through apertures in said adjustable member, a quick acting nut consisting of a plurality of internally threaded rotatable members, a pivoted lever connected with each threaded member of the nut to separate said members, and spring means acting on said levers to hold the threaded members in engagement with the corresponding threaded rod, said adjustable clamping member having a recess to receive said internally threaded members after they have been threaded on said rod to clamping position.

4. The combination, with an adjustable clamping member, and a threaded rod extending loosely through an aperture therein, of a quick acting nut having a pair of separable internally threaded rotatable members, pivoted levers connected with said members for separating the same, a spring acting on said levers to hold said threaded members in engagement with the threads of said rod, said adjustable clamping member having a recess at the point where the rod passes therethrough to receive the internally threaded members to lock the same.

ETHAN A. SCHAEFFER, Jr.